(12) United States Patent
Nitta

(10) Patent No.: US 8,721,351 B2
(45) Date of Patent: May 13, 2014

(54) SENSOR

(75) Inventor: Mikio Nitta, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 170 days.

(21) Appl. No.: 13/521,553

(22) PCT Filed: Jun. 13, 2011

(86) PCT No.: PCT/JP2011/063525
§ 371 (c)(1),
(2), (4) Date: Jul. 11, 2012

(87) PCT Pub. No.: WO2011/158801
PCT Pub. Date: Dec. 22, 2011

(65) Prior Publication Data
US 2012/0289091 A1  Nov. 15, 2012

(30) Foreign Application Priority Data

Jun. 14, 2010  (JP) ................................. 2010-135205

(51) Int. Cl.
*H01C 10/38* (2006.01)
(52) U.S. Cl.
USPC ........................................................ 439/76.1
(58) Field of Classification Search
USPC ........................... 439/76.1; 338/176, 183, 184
See application file for complete search history.

(56) References Cited

U.S. PATENT DOCUMENTS 3,585,563 A * 6/1971 Hegle ............................. 338/180
4,213,112 A * 7/1980 Alman et al. .................. 338/183
4,471,339 A * 9/1984 Fukada et al. ................. 338/162
5,345,215 A * 9/1994 Okumura et al. ............. 338/176
5,587,535 A * 12/1996 Sasaki et al. .................... 73/726
5,917,402 A * 6/1999 Ebata ............................. 338/160
5,993,223 A * 11/1999 Rehhoff ....................... 439/76.1
6,018,992 A * 2/2000 Kaijala ....................... 73/114.36
6,447,342 B1 * 9/2002 Lawlyes et al. ............... 439/686

(Continued)

FOREIGN PATENT DOCUMENTS

| JP | 109015/1983 Y | 7/1983 |
| JP | 104701/1991 Y | 10/1991 |
| JP | H05-82007 A | 11/1995 |
| JP | 2002-373717 A | 12/2002 |

OTHER PUBLICATIONS

International Preliminary Report on Patentability dated Jan. 15, 2013.

(Continued)

*Primary Examiner* — Neil Abrams
(74) *Attorney, Agent, or Firm* — Harness, Dickey & Pierce, PLC

(57) ABSTRACT

The object of the present invention is to provide a sensor which has an advantage in reduction of the noise and for down sizing, and also which are capable to produce easily. A sensor comprising: a case member housing a resistance substrate and a mobile element which slides against said resistance substrate and formed with an aperture leading to said resistance substrate; a connector member having a connector terminal, a cover unit which is a part of a resin covering said connector terminal and covers said aperture of said case member, and a connector unit which is other part of the resin covering said connector terminal and is connected with an external terminal; and a clip resiliently contacting with said connector terminal and said resistance substrate, and electrically connecting said connector terminal and said resistance substrate.

7 Claims, 6 Drawing Sheets

(56) References Cited

U.S. PATENT DOCUMENTS

| | | | |
|---|---|---|---|
| 6,506,069 B2* | 1/2003 | Babala et al. | 439/248 |
| 6,644,984 B2* | 11/2003 | Vista et al. | 439/76.1 |
| 6,731,194 B1* | 5/2004 | Abe | 338/167 |
| 6,765,804 B2 | 7/2004 | Hudson et al. | |
| 6,953,031 B2* | 10/2005 | Ishihara | 123/568.21 |
| 7,484,417 B2* | 2/2009 | Tohyama et al. | 73/753 |
| 8,608,489 B2* | 12/2013 | Nogami et al. | 439/76.1 |
| 2010/0159755 A1* | 6/2010 | Lin et al. | 439/834 |
| 2012/0289091 A1* | 11/2012 | Nitta | 439/626 |
| 2012/0293194 A1* | 11/2012 | Nitta | 324/705 |

OTHER PUBLICATIONS

International Search Report (in Japanese with English translation) for PCT/JP2011/063525, mailed Sep. 20, 2011; ISA/JP.

* cited by examiner

SENSOR

CROSS-REFERENCE TO RELATED APPLICATIONS

This application is a 371 U.S. National Stage of International Application No. PCT/JP2011/063525, filed Jun. 13, 2011, and claims priority to Japanese Patent Application No. 2010-135205, filed on Jun. 14, 2010, the disclosures of which are herein incorporated by reference in their entirety.

TECHNICAL FIELD

The present invention relates to a sensor converting a mechanical displacement into an electronic signal which is called a stroke sensor or a potentiometer.

BACKGROUND ART

In regards with a sensor such as a stroke sensor which detects the mechanical displacement, it is proposed to make the assembling of the sensor easier by making the structure simple while ensuring the detection accuracy of the sensor. For example, it is proposed to mold the connector terminal by the resin constituting the case, or to connect between the resistance substrate and the connector terminal by a clip (refer to Patent document 1).

PRIOR ART DOCUMENT

Patent document 1: Japanese Patent Application Laid Open H05-82007

DISCLOSURE OF THE INVENTION

Technical Problems to be Solved by the Invention

However, in the sensor according to the conventional technology, as the clip is influenced by the surrounding conditions (such as the temperature, the humidity, and the electric discharge or so), in some case there was a difficulty to reduce the amount of noise included in the sensor output. Also, it also had problems such that it was difficult to down size since the space to place the clip is needed, and it can not flexibly cope with the change of the shape of the connector since it is necessary to remake the mold including the case when the shape of the connector is changed.

The present invention has been accomplished by reflecting such problems, and its object is to provide a sensor which has an advantage in reduction of the noise and for down sizing, and also which are capable to produce easily.

Means for Solving the Technical Problems

In order to solve above mentioned objects, the sensor comprising a case member housing a resistance substrate and a mobile element which slides against said resistance substrate and formed with an aperture leading to said resistance substrate;

a connector member having a connector terminal, a cover unit which is a part of a resin covering said connector terminal and covers said aperture of said case member, and a connector unit which is other part of the resin covering said connector terminal and is connected with an external terminal; and a clip resiliently contacting with said connector terminal and said resistance substrate, and electrically connecting said connector terminal and said resistance substrate; wherein said clip comprises a fulcrum and two leg units consisting of a first leg unit and a second leg unit extending to two directions from said fulcrum and said clip has a cross sectional shape of roughly a V shape or U shape, said clip is engaged with an end unit of said resistance substrate in a status that said resistance substrate is sandwiched between said first leg unit and said second leg unit, a housing depression is formed in said connector member at a position opposing said resistance substrate, said housing depression comprises a first lateral wall contacting with a first external face which is an external face of said first leg unit and a second lateral wall contacting with a second external face which is an external face of said second leg unit, and said housing depression houses said clip in a status that said clip is sandwiched between said first lateral wall and said second lateral wall, and a part of said connector terminal is exposed from the resin covering said connector terminal to form at least one of said first lateral wall and said second lateral wall.

The clip included in the sensor of the present invention conducts with the resistance substrate by engaging said resistance substrate in between said first leg unit and said second leg unit. Further, by housing in the housing depression in which a part of the connector terminal is exposed, the clip conducts the connector terminal. That is, the clip included in the sensor of the present invention contacts with the resistance substrate at the internal face of the leg unit, and contacts with the connector terminal at the external face of the leg unit, thereby it can be downsized compared to the clip according to the conventional technology. Therefore, the sensor according to the present invention can reduce the amount of the noise receiving from the clip which is not molded, and can reduce the noise included in the output of the sensor.

Also, the sensor according to the present invention can downsize the clip and the housing depression housing the clip, thus the sensor as a whole can be downsized as well. Also, in the sensor according to the present invention, the connector member including the connector unit is independent from the case member, thus the shape of the connector can be changed without changing the mold of the case member. Therefore, the sensor according to the present invention suppress the influence of the movement change or so of the mobile element caused by the change of the case member mold, and can easily deal with the change of the shape of the connector. Also, the sensor according to the present invention prevents from increasing the number of the members, even though the connector unit and the case member are made independently, since the cover unit covering the aperture of the case member is included in the connector member.

Also, the sensor according to the present invention can be easily assembled since the conductivity of the connector terminal and the resistance substrate is secured by using the clip which resiliently contacts with the connector terminal and the resistance substrate. Further, in the sensor according to the present invention, by joining the connector member and the case member; the clip engaged to the end unit of the resistance substrate is housed in the housing depression, and as a result, the resistance substrate is fixed to the inside of the sensor. Hence, from this point of view as well, the sensor according to the present invention is easy to assemble. Further, the sensor according to the present invention can enlarge the range of the difference of the size of each member, and thus the production is easy.

Further, in said clip, the space between said first leg unit and the second leg unit changes in a wave shape towards the tip of said first leg unit and said second leg unit, and said clip may have a dent unit in which the space between said first leg unit and said second leg unit becomes local minimum, and when said clip is in free condition, the space between said first leg unit and said second leg unit in said dent unit may be smaller than the thickness of said resistance substrate.

Also, for example, the clip may have a peak unit where the space between said first leg unit and said second leg unit is local maximum, at the position further distant from said fulcrum with respect to said dent unit, and said first external face of said first leg unit may contact with said first lateral wall at said peak unit and said second external face of said second leg unit may contact said second lateral wall at said peak unit.

By having above mentioned dent unit at the clip, such clip can securely ensure the conductivity with the resistance substrate, and in case of producing the sensor, it can be easily pre-assembled to the resistance substrate. Also, by the clip having the peak unit, such clip contacts more securely with the resistance substrate and the housing depression, after the assembling, and the resistance substrate can be securely fixed.

Also, for example, the tip of said clip may have a shape which the space between said first leg unit and said second leg unit opens towards the tip direction, and said first leg unit and second leg unit may have roughly a symmetrical shape against each other.

The clip having such shape can easily engage to the end unit of the resistance substrate, thus the sensor comprising such clip can be easily assembled. Also, as for the clip having the first leg unit and the second leg unit having a shape of roughly symmetrical shape against each other, when assembling, there is no need to consider which is the first leg unit or the second leg unit among the legs of the clip. Therefore, the sensor comprising such clip can be assembled easily.

Also, for example, said first lateral wall or said second lateral wall may be constituted by a part of the resin covering said connector terminal, and said second lateral wall may be formed by inclining against said first lateral wall so that the space between said first lateral wall and said second lateral wall becomes small towards a bottom portion of said housing depression.

By setting either one of the first lateral wall and the second lateral wall as the exposed component of the connector terminal, and either one as the resin, the shape of the connector terminal can be made simple. Also, by constituting the shape of the housing depression so that it becomes narrower towards the bottom portion, the aperture of the housing depression can be made wider. By using the connector member formed with such housing depression, the clip can be easily housed in the housing depression when assembling, thus such sensor can be assembled easily.

MODES FOR CARRYING OUT THE INVENTION

Figure 1:
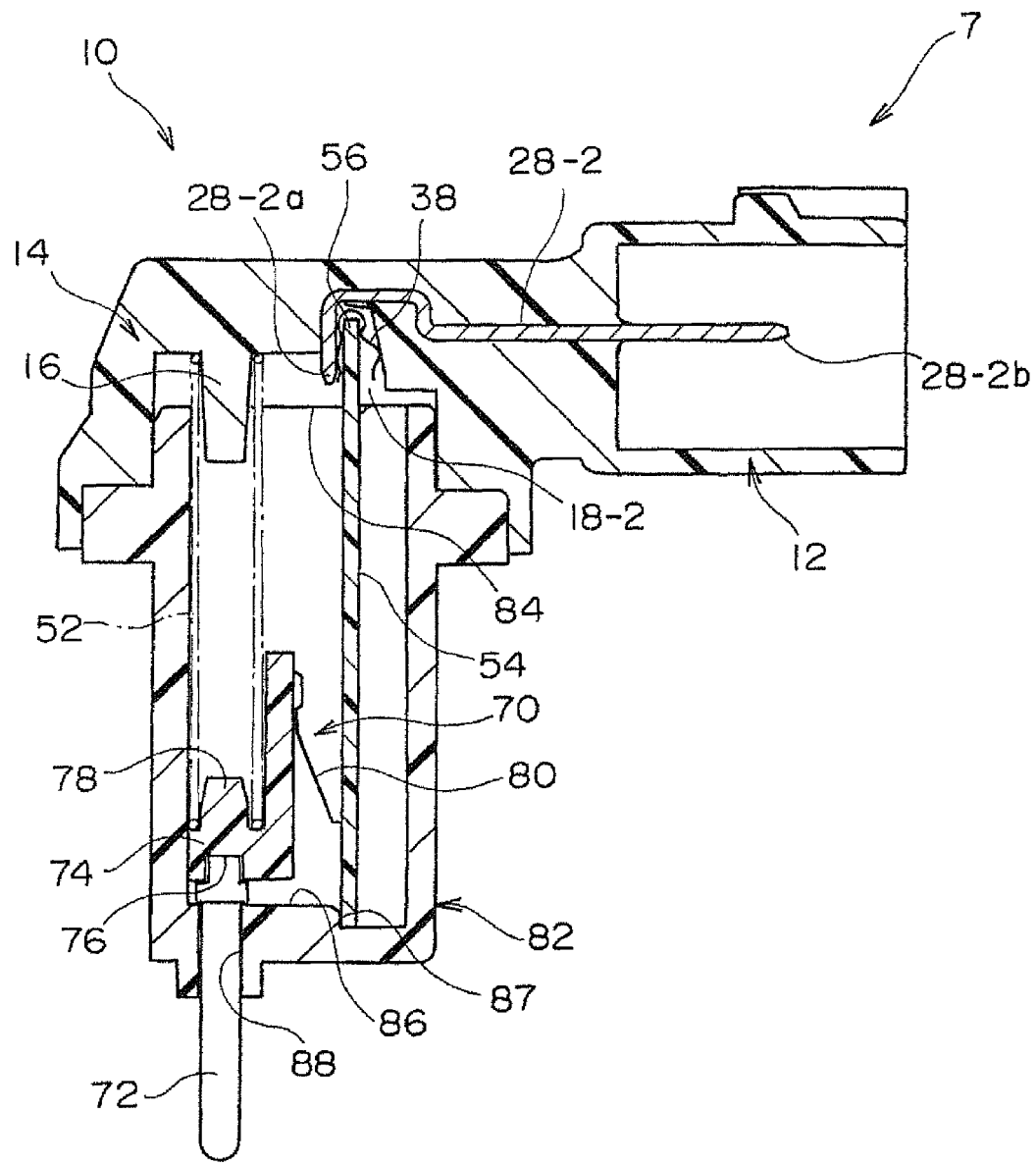
FIG. 1 is a cross section of the sensor according to one embodiment of the present invention.

FIG. 1 is a cross section of the sensor 7 according to one embodiment of the present invention. The sensor 7 converts the mechanical displacement transferred from the shaft 72 to an electrical signal of a change in the voltage value or so, which is called a stroke sensor or a potentiometer.

When using the sensor 7, the tip of the shaft 72 contacts with the measuring object of which the displacement is to be measured by the sensor 7. The displacement of the measuring object is converted to the change of the voltage value by the resistance substrate 54 sliding against the mobile element 70 and the mobile element 70 including the shaft 72. Also, the connector unit 12 is connected with the external terminal of other machines using the output of the sensor 7. Therefore, the change of the voltage value generated by the relative movement of the mobile element 70 against the resistance substrate 54 is transferred to other machines using the output of the sensor 7 via the connector terminal 28-2.

As shown in FIG. 1, the sensor 7 comprises the case member 82, and the connector member 10. The case member 82 houses the resistance substrate 54 and the mobile element 70 sliding against the resistance substrate 54. At the case member 82, the case aperture 84 which leads to the resistance substrate 54 is formed. The case member 82 is made by, for example, a resin, however it is not limited thereto.

The connector member 10 is formed by the connector terminal 28-2, the cover unit 14 having a function to cover the case aperture 84 of the case member 82, and the connector unit 12 having a function as the connector to which the external terminal is connected. The cover unit 14 and the connector unit 12 are constituted by the resin material continuous with each other, and the surface of the connector terminal 28-2 is covered by the resin material constituting the cover unit 14 and the connector unit 12, except for the both ends of the connector terminal 28-2. Also, the one end of the connector terminal 28-2 is exposed at the cover unit 14, and the other end of the connector terminal 28-2 is exposed at the connector unit 12. The connector member 10 according to the present embodiment is produced by molding to which the connector terminal 28-2 is inserted, and there is no need to assemble the connector terminal to the case or so which has been additionally molded, thus it can be easily assembled. Note that, the production method of the connector member 10 is not limited to the molding, and it may be other production method.

The sensor 7 comprises clip 38. The clip 38 is placed in between the case member 82 and the connector member 10. The clip 38 resiliently contacts with the connector terminal 28-2 and the resistance substrate 54, and electrically connects the connector terminal 28-2 with the resistance substrate 54. The clip 38 is produced by a conductive material having a resilience, and for example it is produced by a metal material or so.

Figure 6:
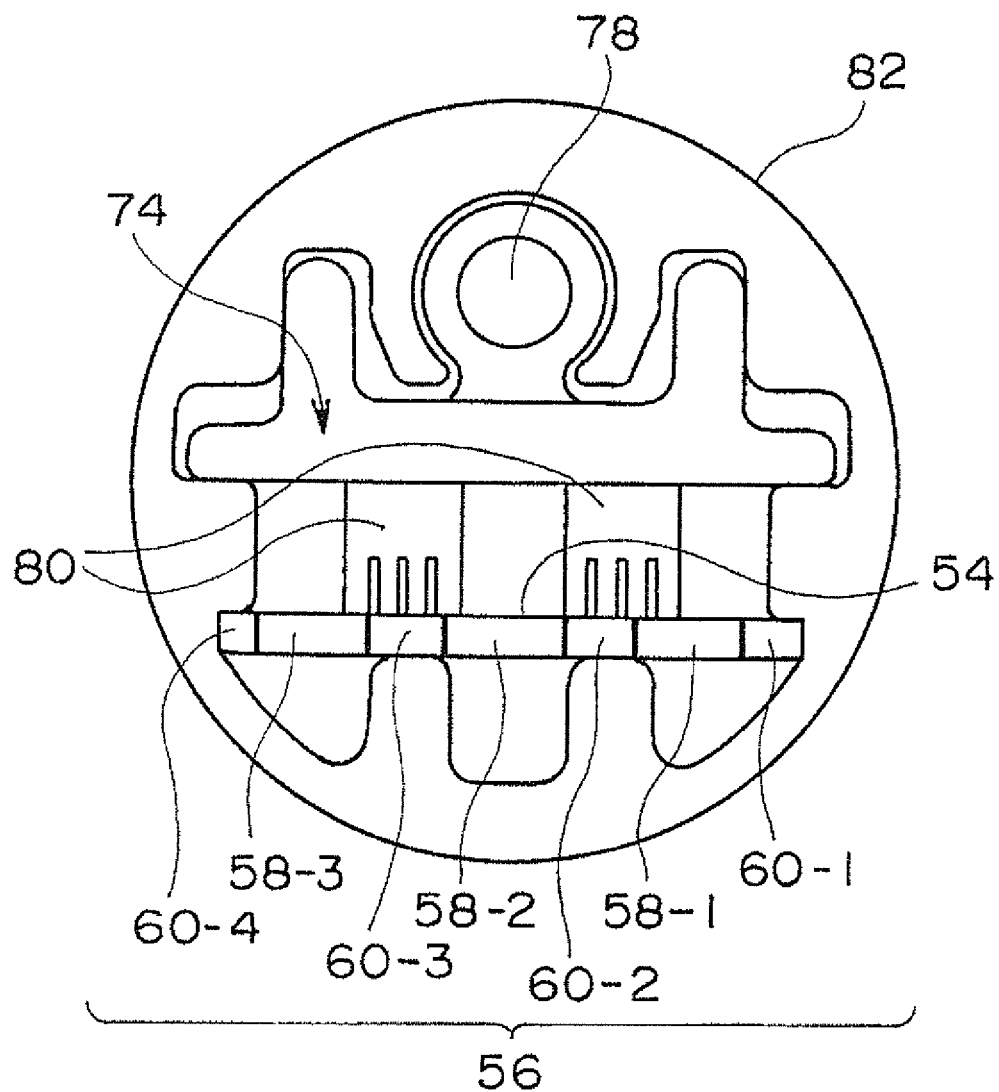
FIG. 6 is a top view of the case member included in the sensor shown in FIG. 1.

As shown in FIG. 1 and FIG. 6, the case member 82 has a shape of roughly a cylinder, and at one end of the case member 82, the case bottom portion 86 is formed. Note that, the shape of the case member 82 is not limited to a cylinder, and it may be other shape such as polygonal column or so.

As shown in FIG. 1, the mobile element 70 housed in the case member 82 is placed in a movable manner relative against the case member 82 and the resistance substrate 54 fixed to the case member 82. The mobile element 70 comprises the shaft 72, the sliding element receiver 74, and the brush 80. At the case bottom portion 86, the guide hole 88 which is a through hole for inserting the shaft 72 is formed, and the shaft 72 is placed in a movable manner in the axial direction at the guide hole 88 formed at the case bottom portion 86.

At the face opposing the case bottom portion 86 of the sliding element receiver 74, the bearing hole portion 76 is formed. One end of the shaft 72 is in contact with the bearing hole portion 76. Also, at the face opposing the case aperture 84 of the sliding element receiver 74, the spring receiver projection 78 is formed. At the spring receiver projection 78, the end unit of the returning spring 52 is engaged, and the sliding element receiver 74 is biased towards the case bottom portion 86 by returning spring 52. Note that, the other end of the returning spring 52 is engaged to the cover side projection 16 formed at the cover unit 14.

At the sliding element receiver 74, the brush 80 is attached. As shown in FIG. 6, the brush 80 has two tip portions contacting the resistance substrate 54. The tip portion of the brush 80 along the displacement of the shaft 72 shown in FIG. 1 slides against the resistor 68 (refer to FIG. 4) and the second conductive pattern 64 formed on the surface of the resistance substrate 54. The brush 80 is produced using the plate shape material having resilience and conductivity such as metal; however the shape of the brush 80 or so is not particularly limited.

Figure 4:
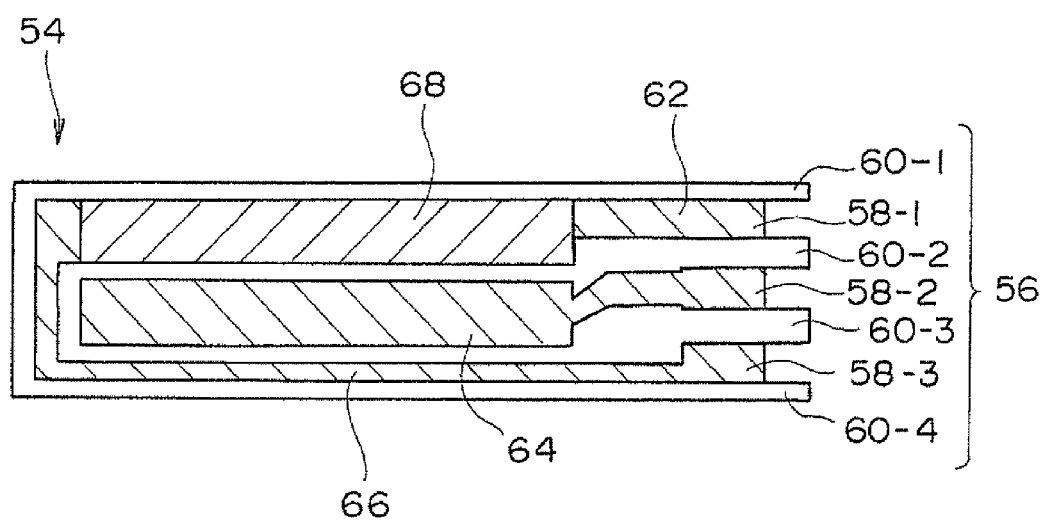
FIG. 4 is a side view of the resistance substrate included in the sensor shown in FIG. 1.

As shown in FIG. 1 and FIG. 4, the resistance substrate 54 has a shape of rectangular plate. One end of the resistance substrate 54 is engaged with step unit 87 formed at the case bottom portion 86, and the substrate end unit 56 which is the other end of the resistance substrate 54 projects out from the aperture of the case member 82. As shown in FIG. 4, at the surface of the brush 80 side of the resistance substrate 54, the first conductive pattern 62, the second conductive pattern 64, the third conductive pattern 66 and the resistor 68 are formed.

The first to third conductive patterns 62 to 66 are produced, for example, by printing the metals or so having low electric resistance, and the resistor 68 is produced by using the material having higher electrical resistance than the first to third conductive patterns 62 to 66. As shown in FIG. 6, one side of the tip portion of the brush 80 contacts and slides against the resistor 68, and other side of the tip portion of the brush 80 contacts and slides against the second conductive pattern 64. The resistor 68 and the first to third conductive patterns 62 to 66 constitute the variable resistor together with the brush 80 which contact therewith.

As shown in FIG. 4, at the substrate end unit 56, the projection units 60-1 to 60-4, and the slits 58-1 to 58-3 are formed. The slit 58-1 is formed in between the projection units 60-1 and 60-2, the slit 58-2 is formed in between the projection units 60-2 and 60-3, and the slit 58-3 is formed in between the projection units 60-3 and 60-4, respectively. The slits 58-1 to 58-3 are formed at the portion corresponding to the first to third conductive patterns 62 to 66.

Figure 5:
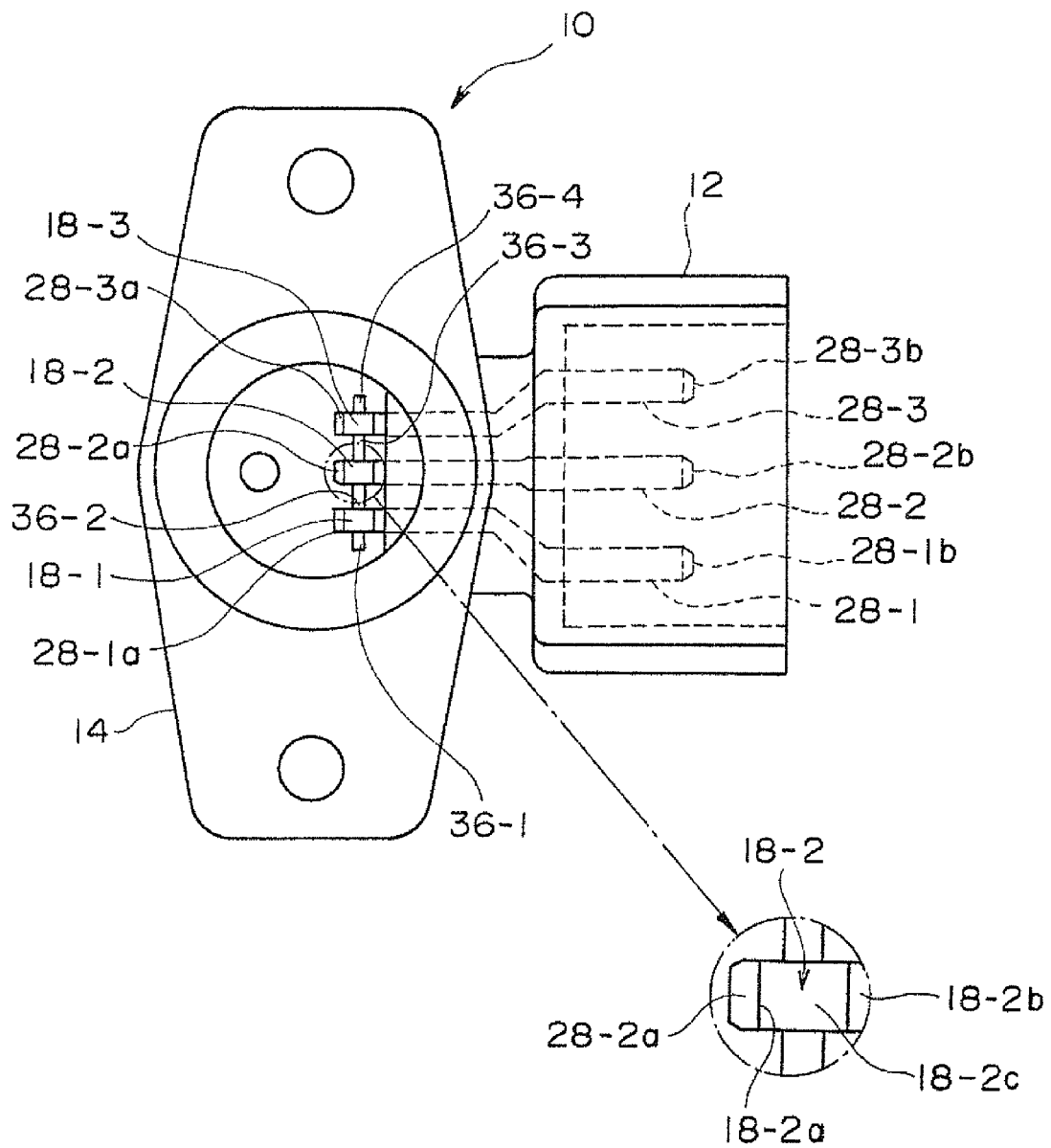
FIG. 5 is a bottom view of the connector member included in the sensor shown in FIG. 1.

FIG. 5 is a figure observing the connector member 10 from the case member 82 side and is a bottom view of the connector member 10. The connector member 10 comprises three connector terminals 28-1 to 28-3. As shown in FIG. 1 and FIG. 5, both ends of each connector terminal 28-1 to 28-3 are exposed from the cover unit 14 and the connector unit 12, and constitutes the exposed component exposed from the resin material.

That is, as shown in FIG. 1, at the end unit of the case member 82 side of the connector terminal 28-2, the first exposed component 28-2a exposing from the cover unit 14 made of resin is formed. The first exposed component 28-2a constitutes a part of the lateral wall of the housing depression 18-2. Also, at the end unit of the connector unit 12 side of the connector terminal 28-2, the second exposed component 28-2b exposing from the connector unit 12 made of resin is formed. When using the sensor 7, the second exposed component 28-2b is in contact with the terminal of the external terminals connected with the connector unit 12.

Figure 2:
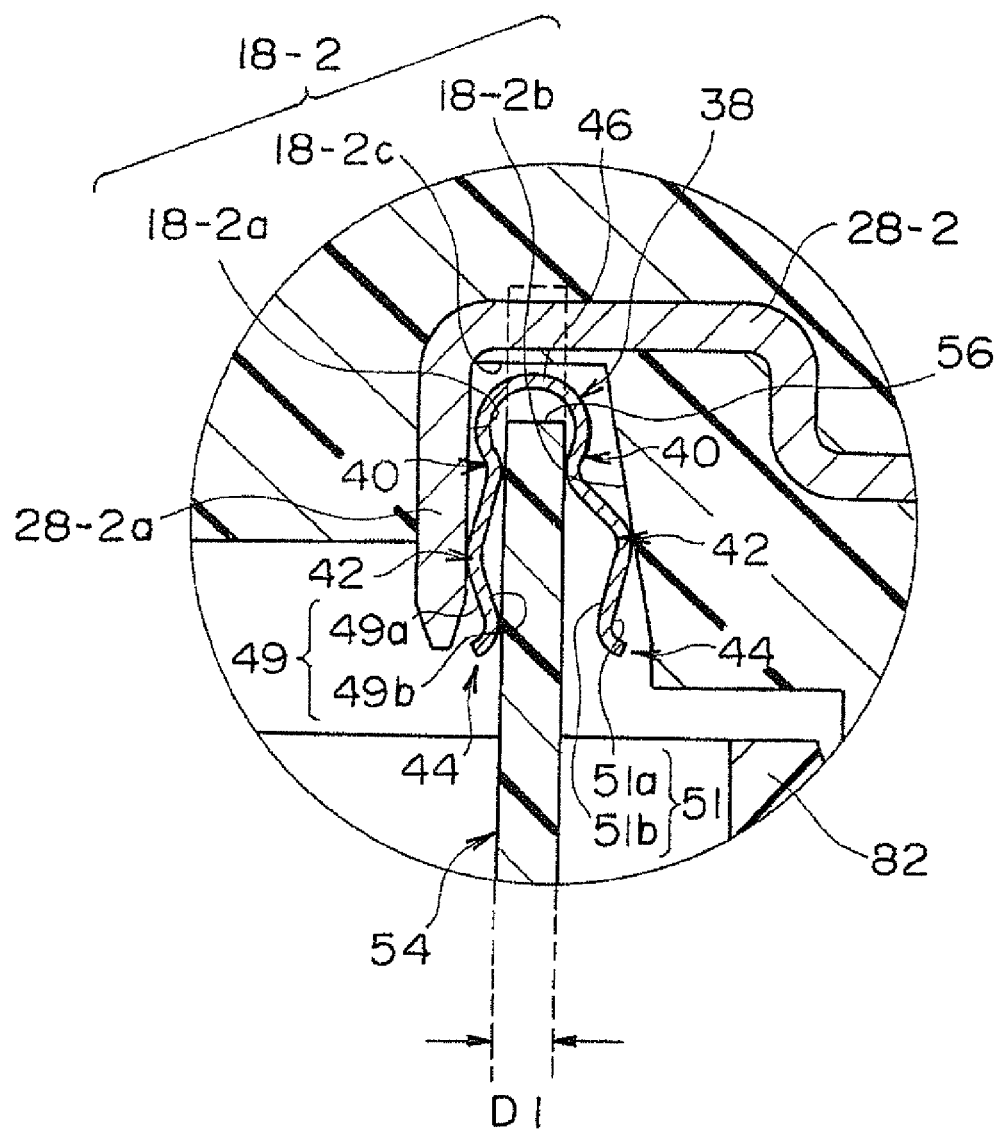
FIG. 2 is an enlarged cross section of which the conductive portion of the resistance substrate and the connector terminal in the sensor shown in FIG. 1 has been enlarged.

As shown in the enlarged partial figure in FIG. 5, the housing depression 18-2 comprises a first lateral wall 18-2a constituted by the first exposed component 28-2a of the connector terminal 28-2, and a second lateral wall 18-2b made of resin material opposing the first lateral wall 18-2a. Also, as shown in FIG. 2, the second lateral wall 18-2b is formed by inclining to the first lateral wall 18-2a so that the space between the first lateral wall 18-2a becomes narrower towards the depression bottom portion 18-2c which is a bottom portion of the housing depression 18-2.

Note that, as shown in FIG. 5, in regards with the connector terminal 28-1 and 28-3, the first exposed component 28-1a, 28-3a, and the second exposed component 28-1b, 28-3b are formed, as similar to the connector terminal 28-2. The first exposed component 28-1a and 28-3a, as similar to the first exposed component 28-2a, constitutes the first lateral wall of the housing depression 18-1 and 18-3, and the housing depression 18-1 and 18-3 has the shape and the constitution similar to the housing depression 18-2 as described in above.

At the face opposing the case member 82 in the cover unit 14, depression units 36-1 to 36-4 are formed in addition to the above mentioned housing depressions 18-1 to 18-3. Each housing depressions 18-1 to 18-3 and depression units 36-1 to 36-4 are formed alternatively along the straight line direction. The housing depression 18-1 is formed in between the depression units 36-1 and 36-2, the housing depression 18-2 is formed in between the depression units 36-2 and 36-3, and the housing depression 18-3 is formed in between the depression units 36-3 and 36-4. At the depression units 36-1 to 36-4, the projection units 60-1 to 60-4 which are formed at the substrate end unit 56 (refer to FIG. 4).

As shown in FIG. 1, the sensor 7 comprises the clip 38 which resiliently contacts with the first exposed component 28-2a of the connector terminal 28-2 and the second conductive pattern 64 of the resistance substrate 54 (refer to FIG. 4), and electrically connect the first exposed component 28-2a and the second conductive pattern 64. As shown in FIG. 3(b) of the cross section of the clip 38, the clip 38 has a cross sectional shape of roughly V shape.

The clip 38 comprises a fulcrum 46, and two leg units consisting of the first leg unit 49 and the second leg unit 51 which extends to the two directions from the fulcrum 46. The angle formed in between the first leg unit 49 and the second leg unit 51 is not particularly limited, for example the first leg unit 49 and the second leg unit 51 may be approximately parallel and the clip 38 may have a cross sectional shape of roughly U shape.

Figure 3A:
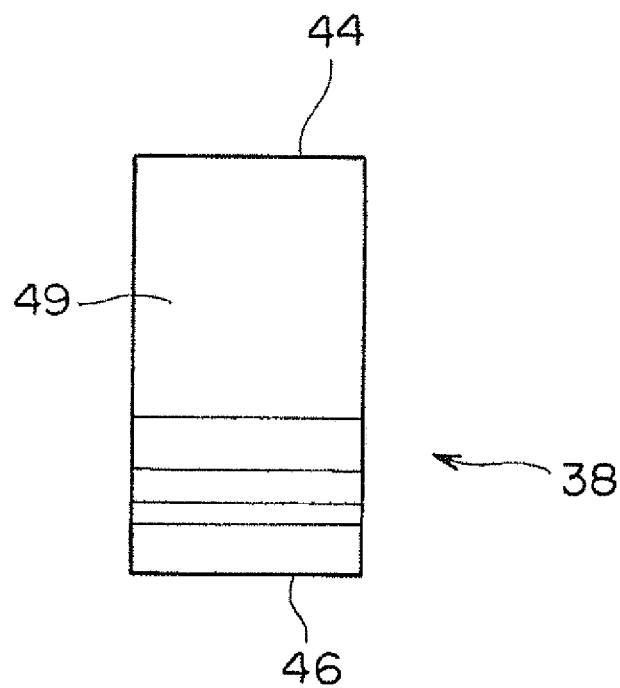
FIG. 3 is a side view and a cross sectional view of the clip included in the sensor shown in FIG. 1.
Figure 3B:
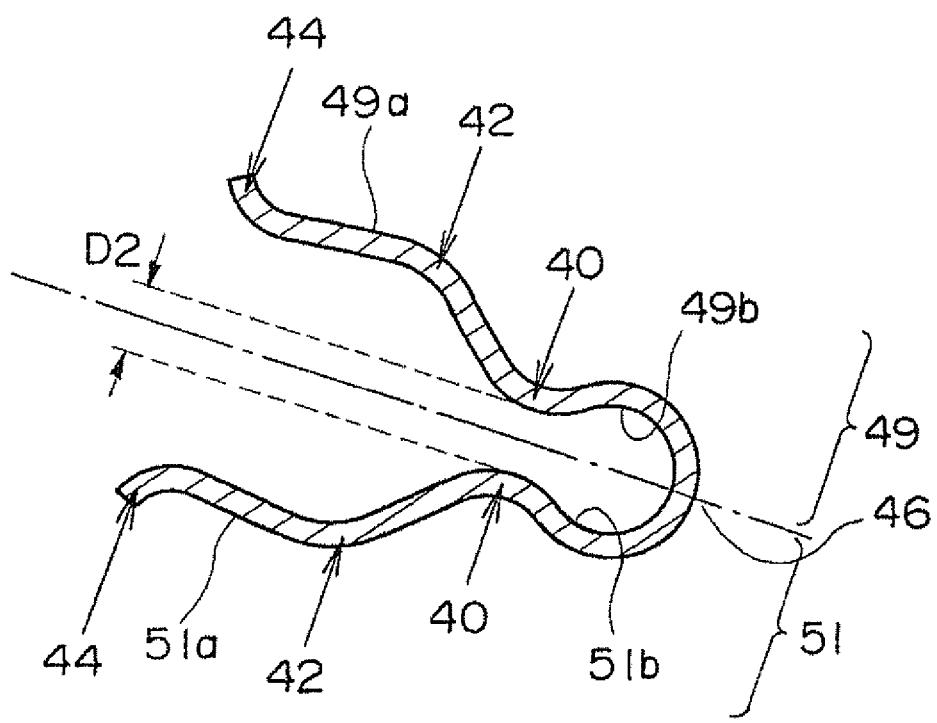

FIG. 3(a) is a side view observing the clip 38 from the first leg unit 49 side. As shown in FIG. 3(a), when the clip 38 is observed from the first leg unit 49 side, the clip 38 has a rectangular shape having a longitudinal direction in the direction towards the tip portion 44 from the fulcrum 46.

As shown in FIG. 3(b), at the clip 38, the space between the first leg unit 49 and the second leg unit 51 changes towards the tip portion 44 of the clip 38 from the fulcrum 46 of the clip 38 as a wave shape. Here, the clip 38 comprises the dent unit 40 where the space between the first leg unit 49 and the second leg unit 51 becomes a local minimum. The space D2 between the internal face of the first leg unit 49 (the first internal face 49b) and the internal face of the second leg unit 51 (the second internal face 51b) in the dent unit 40 are not particularly limited, however when the clip 38 is in a free condition as shown in FIG. 3(b), it is preferable to be smaller than the thickness D1 of the resistance substrate 54 shown in FIG. 2. Such clip 38 is capable of securely ensuring the conductivity with the resistance substrate 54, and when producing the sensor 7, it contributes to the easy assembling of the sensor 7 since it is easily held by engaging the resistance substrate 54.

Also, the clip 38 comprises the peak unit 42 where the space between the first leg unit 49 and the second leg unit 51 becomes a local maximum, at the position further distant than the dent unit 40 with respect to the fulcrum 46. The tip 44 of the clip 38 has a shape which the first leg unit 49 and the second leg unit 51 open towards the tip 44 direction. By having the shape that the tip 44 of the clip 38 can be opened, it is easy to engage the clip 38 to the resistance substrate 54, and the sensor 7 having such clip 38 can be easily assembled.

In the clip 38 according to the present embodiment, the first leg unit 49 and the second leg unit 51 has roughly a symmetrical shape against each other. Therefore, the clip 38 has a symmetrical shape across the fulcrum 46, and when assembling, there is no need to consider whether it is the first leg unit 49 or the second leg unit 51. Therefore, the sensor comprising such clip 38 is easy to assemble.

FIG. 2 is an enlarged view of the conductive portion of the resistance substrate 54 and the connector terminal 28-2 in the sensor 7 shown in FIG. 1.

The clip 38 is engaged with the substrate end unit 56 of the resistance substrate 54 in a state that the resistance substrate 54 is sandwiched between the first leg unit 49 and the second leg unit 51. The clip 38 shown in FIG. 2 is placed at the position corresponding to the slit 58-2 (refer to FIG. 4) formed in between the projection unit 60-2 and the projection unit 60-3. In the assembled state shown in FIG. 2, the first internal face 49b at the clip 38 shown in FIG. 3 is in contact with the second conductive pattern 64 of the resistance substrate 54 shown in FIG. 4 and the clip 38 is conducted with the second conductive pattern 64 in the dent unit 40.

As shown in FIG. 2, the first external face 49a which is the external face of the first leg unit 49 at the clip 38 is in contact with the first lateral wall 18-2a of the housing depression 18-2 at the peak unit 42 of the clip 38. As described in above, the first lateral wall 18-2a is constituted by the first exposed component 28-2a of the connector terminal 28-2. Therefore, in the assembled state shown in FIG. 2, the first external face 49a of the clip 38 is in contact with the connector terminal 28-2, and the clip 38 conducts with the connector terminal 28-2.

Also, the second external face 51a which is the external face of the second leg unit 51 at the clip 38 is in contact with the second lateral wall 18-2b of the housing depression 18-2 at the peak unit 42 of the clip 38. By second external face 51a of the clip 38 contacting the second lateral wall 18-2b, the first leg unit 49 of the clip 38 is biased towards the first lateral wall 18-2a, thus the first leg unit 49 can securely be in contact with the first lateral wall 18-2a. Also, by the first external face 49a being in contact with the first lateral wall 18-2a and the second external face being in contact with the second lateral wall 18-2b, the clip 38 and the substrate end unit 56 with which the clip 38 is engaged are fixed to the connector member 10.

Note that, the second lateral wall 18-2b of the housing depression 18-2 is formed so that it inclines to the first lateral wall 18-2a, thus the clip 38 is housed in the housing depression 18-2 in a state being inclined to the resistance substrate 54. In this case, the area of tip 44 of the first leg unit 49 is in contact with the resistance substrate 54, thereby the conductivity of the clip 38 and the resistance substrate 54 is further ensured and the resistance substrate 54 is further securely fixed.

As shown in FIG. 2, in the above mentioned embodiment, the electrical connection point of the clip 38 against the resistance substrate 54 is the internal face 49b of the first leg unit 49, however for example, the conductive pattern may be extended to the back face of the resistance substrate 54, thereby the electrical connection point of the clip 38 against the resistance substrate 54 may be provided at the second internal face 51b of the second leg unit 51. Also, the electrical connection point of the clip 38 against the connector terminal 28-1 to 28-2 is not limited to the first external face 49a of the first leg unit 49, and for example by changing the shape of the first exposed component 28-2a, the electrical connection point of the clip 38 against the connector terminals 28-1 to 28-2 may be provided at the second external face 51a of the second leg unit 51.

The clip 38 similar to that of shown in FIG. 2 is also placed in the position corresponding to the slits 58-1 and 58-3 shown in FIG. 4, and these clips 38 are housed in the housing depression 18-1 and housing depression 18-3 shown in FIG. 5. The clip 38 housed in the housing depression 18-1 is placed at the position corresponding to the slit 58-1 of the resistance substrate 54 (refer to FIG. 4), and contacts and conducts with the first conductive pattern 62 and the connector terminal 28-1. Also, the clip 38 housed in the housing depression 18-3 is placed at the position corresponding to the slit 58-3 of the resistance substrate 54 (refer to FIG. 4), and contacts and conducts with the third conductive pattern 66 and the connector terminal 28-3. The clip 38 housed in the housing depression 18-1 and the housing depression 18-3 are housed in a same condition as the clip 38 housed in the housing depression 18-2 shown in FIG. 2 then fixed, thus the explanation will be omitted.

The invention claimed is:

1. A sensor comprising:
   a case member housing a resistance substrate and a mobile element which slides against said resistance substrate and formed with an aperture leading to said resistance substrate;
   a connector member having a connector terminal, a cover unit which is a part of a resin covering said connector terminal and covers said aperture of said case member, and a connector unit which is other part of the resin covering said connector terminal and is connected with an external terminal; and
   a clip resiliently contacting with said connector terminal and said resistance substrate, and electrically connecting said connector terminal and said resistance substrate; wherein
   said clip comprises a fulcrum and two leg units consisting of a first leg unit and a second leg unit extending to two directions from said fulcrum and said clip has a cross sectional shape of roughly a V shape or U shape,
   said clip is engaged with an end unit of said resistance substrate in a status that said resistance substrate is sandwiched between said first leg unit and said second leg unit,
   a housing depression is formed in said connector member at a position opposing said resistance substrate, said housing depression comprises a first lateral wall contacting with a first external face which is an external face of said first leg unit and a second lateral wall contacting with a second external face which is an external face of said second leg unit, and said housing depression houses said clip in a status that said clip is sandwiched between said first lateral wall and said second lateral wall, and
   a part of said connector terminal is exposed from the resin covering said connector terminal to form at least one of said first lateral wall and said second lateral wall.

2. The sensor as set forth in claim 1 wherein;
   a space between said first leg unit and said second leg unit in said clip changes towards a tip of said clip from said fulcrum as a wave shape,
   said clip comprises a dent unit in which the space between said first leg unit and said second leg unit is local minimum and a peak unit in which the space between said first leg unit and said second leg unit is local maximum and is at the position farther distant than said dent unit with respect to said fulcrum, the space between said first leg unit and said second leg unit at said dent unit is smaller than a thickness of said resistance substrate when said clip is in a free state, and said first external face of said first leg unit is in contact with said first lateral wall at said peak unit, and said second external face of said second leg unit is in contact with said second lateral wall at said peak unit.

3. The sensor as set forth in claim 1, wherein;

the tip of said clip has a shape which the space between said first leg unit and said second leg unit opens towards the tip direction, and said first leg unit and said second leg unit has a roughly a symmetrical shape against each other.

4. The sensor as set forth in claim 1, wherein;

said first lateral wall or said second lateral wall are constituted by a part of the resin covering said connector terminal, and said second lateral wall is formed by inclining to said first lateral wall so that the space between said first lateral wall and said second lateral wall becomes small towards a bottom portion of said housing depression.

5. The sensor as set forth in claim 2, wherein;

the tip of said clip has a shape which the space between said first leg unit and said second leg unit opens towards the tip direction, and said first leg unit and said second leg unit has a roughly a symmetrical shape against each other.

6. The sensor as set forth in claim 2, wherein;

said first lateral wall or said second lateral wall are constituted by a part of the resin covering said connector terminal, and said second lateral wall is formed by inclining to said first lateral wall so that the space between said first lateral wall and said second lateral wall becomes small towards a bottom portion of said housing depression.

7. The sensor as set forth in claim 3, wherein;

said first lateral wall or said second lateral wall are constituted by a part of the resin covering said connector terminal, and said second lateral wall is formed by inclining to said first lateral wall so that the space between said first lateral wall and said second lateral wall becomes small towards a bottom portion of said housing depression.

\* \* \* \* \*